(12) United States Patent
Forte

(10) Patent No.: US 10,181,610 B2
(45) Date of Patent: Jan. 15, 2019

(54) FAST STARTING FUEL CELL

(71) Applicant: HYDROGENICS CORPORATION, Mississauga (CA)

(72) Inventor: Paolo Forte, Maple (CA)

(73) Assignee: HYDROGENICS CORPORATION, Mississauga (CA)

( * ) Notice: Subject to any disclaimer, the term of this patent is extended or adjusted under 35 U.S.C. 154(b) by 47 days.

(21) Appl. No.: 15/026,449

(22) PCT Filed: Oct. 1, 2014

(86) PCT No.: PCT/CA2014/050943
§ 371 (c)(1),
(2) Date: Mar. 31, 2016

(87) PCT Pub. No.: WO2015/048896
PCT Pub. Date: Apr. 9, 2015

(65) Prior Publication Data
US 2016/0218381 A1 Jul. 28, 2016

Related U.S. Application Data

(60) Provisional application No. 61/885,787, filed on Oct. 2, 2013.

(51) Int. Cl.
*H01M 8/04225* (2016.01)
*H01M 8/2457* (2016.01)
(Continued)

(52) U.S. Cl.
CPC ... *H01M 8/04225* (2016.02); *H01M 8/04201* (2013.01); *H01M 8/04223* (2013.01);
(Continued)

(58) Field of Classification Search
CPC ............ G06F 1/00; G06F 1/26; H01M 16/00; H01M 16/003; H01M 16/006;
(Continued)

(56) References Cited

U.S. PATENT DOCUMENTS 4,069,371 A 1/1978 Zito
6,215,272 B1 4/2001 Ohara et al.
(Continued)

FOREIGN PATENT DOCUMENTS

CA 2741180 A1 5/2010
CA 2792711 A1 9/2011
(Continued)

OTHER PUBLICATIONS

Chinese Patent Application No. 201380022983, Office Action dated Jan. 20, 2017—With English Translation.
(Continued)

*Primary Examiner* — Lincoln Donovan
*Assistant Examiner* — David Mattison

(57) ABSTRACT

An electrical power supply system has a fuel cell module and a battery. The fuel cell can be selectively connected to the battery system through a diode. The system preferably also has a current sensor and a controller adapted to close a contactor in a by-pass circuit around the diode after sensing a current flowing from the fuel cell through the diode. The system may also have a resistor and a contactor in another by-pass circuit around the diode. In a start-up method, a first contactor is closed to connect the fuel cell in parallel with the battery through the diode and one or more reactant pumps for the fuel cell are turned on. A current sensor is monitored for a signal indicating current flow through the diode. After a current is indicated, a by-pass circuit is provided around the diode.

19 Claims, 2 Drawing Sheets

(51) Int. Cl.

| | | |
|---|---|---|
| H01M 8/2483 | (2016.01) | |
| H01M 8/04223 | (2016.01) | |
| H02J 7/34 | (2006.01) | |
| H01M 8/04082 | (2016.01) | |
| H01M 8/04537 | (2016.01) | |
| H01M 16/00 | (2006.01) | |
| H02J 1/10 | (2006.01) | |
| H01M 8/04746 | (2016.01) | |
| H01M 8/04302 | (2016.01) | |
| H01M 8/1007 | (2016.01) | |
| H01M 8/1018 | (2016.01) | |
| H02J 1/00 | (2006.01) | |

(52) U.S. Cl.
CPC ... *H01M 8/04302* (2016.02); *H01M 8/04574* (2013.01); *H01M 8/04753* (2013.01); *H01M 8/1007* (2016.02); *H01M 8/1018* (2013.01); *H01M 8/2457* (2016.02); *H01M 8/2483* (2016.02); *H01M 16/003* (2013.01); *H01M 16/006* (2013.01); *H02J 1/108* (2013.01); *H01M 2008/1095* (2013.01); *H01M 2220/10* (2013.01); *H01M 2220/20* (2013.01); *H01M 2250/10* (2013.01); *H01M 2250/20* (2013.01); *H01M 2250/402* (2013.01); *H01M 2300/0082* (2013.01); *H02J 7/34* (2013.01); *H02J 2001/004* (2013.01); *Y02B 90/12* (2013.01); *Y02T 90/32* (2013.01)

(58) Field of Classification Search
CPC ..... H01M 2008/00; H01M 2008/1095; H01M 2220/00; H01M 2220/10; H01M 2220/20; H01M 2250/00; H01M 2250/10; H01M 2250/20; H01M 2250/402; H01M 2300/00; H01M 2300/0082; H01M 8/00; H01M 8/04201; H01M 8/04223; H01M 8/04225; H01M 8/04574; H01M 8/04753; H01M 8/1018; H02J 1/00; H02J 1/10; H02J 1/102; H02J 1/108; H02J 2001/00; H02J 2001/004; H02J 7/00; H02J 7/34; H02J 7/35; Y02B 90/00; Y02B 90/12; Y02E 60/00; Y02E 60/12; Y02T 90/00; Y02T 90/32
USPC .......................................................... 307/43
See application file for complete search history.

(56) References Cited

U.S. PATENT DOCUMENTS

| | | | |
|---|---|---|---|
| 6,399,231 B1 | 6/2002 | Donahue et al. | |
| 6,939,633 B2 | 9/2005 | Goebel | |
| 7,291,411 B2 | 11/2007 | Pettit et al. | |
| 7,425,379 B2 | 9/2008 | Joos | |
| 7,465,507 B2 | 12/2008 | Devries et al. | |
| 7,670,700 B2 | 3/2010 | Imamura et al. | |
| 7,862,943 B2 | 1/2011 | Hortop et al. | |
| 8,048,579 B2 | 11/2011 | Robb | |
| 8,125,193 B2 | 2/2012 | Page et al. | |
| 8,283,082 B2 | 10/2012 | Ojima et al. | |
| 8,492,046 B2 | 7/2013 | Yu et al. | |
| 2003/0111977 A1* | 6/2003 | Pearson ............ | H01M 8/04007 320/101 |
| 2004/0001980 A1 | 1/2004 | Balliet et al. | |
| 2004/0076860 A1 | 4/2004 | Aso | |
| 2005/0106424 A1 | 5/2005 | Elhamid et al. | |
| 2005/0186454 A1 | 8/2005 | Clingerman et al. | |
| 2005/0227126 A1 | 10/2005 | Korytnikov et al. | |
| 2006/0063044 A1 | 3/2006 | Devries et al. | |
| 2006/0083965 A1 | 4/2006 | Rainville et al. | |
| 2006/0093879 A1 | 5/2006 | Yang et al. | |
| 2006/0115700 A1 | 6/2006 | Kotani et al. | |
| 2006/0194087 A1 | 8/2006 | Park et al. | |
| 2006/0238033 A1 | 10/2006 | Raiser et al. | |
| 2008/0038595 A1 | 2/2008 | Buchi et al. | |
| 2008/0145716 A1 | 6/2008 | Yu et al. | |
| 2008/0160370 A1 | 7/2008 | Masse et al. | |
| 2008/0248346 A1 | 10/2008 | Fujimura et al. | |
| 2009/0243390 A1 | 10/2009 | Oto | |
| 2009/0280373 A1 | 11/2009 | Baaser et al. | |
| 2010/0035096 A1 | 2/2010 | Britz et al. | |
| 2010/0239927 A1 | 9/2010 | Moran et al. | |
| 2010/0310955 A1 | 12/2010 | Yadha et al. | |
| 2011/0003222 A1* | 1/2011 | Margiott ........... | H01M 8/04223 429/429 |
| 2013/0164645 A1* | 6/2013 | Takaichi ........... | H01M 8/04552 429/432 |

FOREIGN PATENT DOCUMENTS

| | | |
|---|---|---|
| CN | 1618143 A | 5/2005 |
| CN | 101222064 A | 7/2008 |
| CN | 101911356 A | 12/2010 |
| DE | 102011115846 A1 | 4/2013 |
| JP | 2005302648 A | 10/2005 |
| JP | 2006286558 A | 10/2006 |
| JP | 2009123599 A | 6/2009 |
| KR | 20040005144 A | 1/2004 |
| KR | 20110058459 A | 6/2011 |
| WO | 2004114448 A2 | 12/2004 |
| WO | 2005036683 A1 | 4/2005 |
| WO | 2007090284 A1 | 8/2007 |
| WO | 2008027043 A1 | 3/2008 |
| WO | 2011077229 A1 | 6/2011 |

OTHER PUBLICATIONS

Chinese Patent Application No. 201380022983, Office Action dated May 3, 2016—With English Translation.
European Patent Application No. 13773056, Supplementary European Search Report dated Dec. 9, 2015.
European Patent Application No. 13784496, Supplementary European Search Report dated Dec. 17, 2015.
International Patent Application No. PCT/CA2013/050256, International Preliminary Report on Patentability dated Oct. 16, 2014.
International Patent Application No. PCT/CA2013/050256, International Search Report and Written Opinion dated Jul. 2, 2013.
International Patent Application No. PCT/CA2013/050345, International Preliminary Report on Patentability dated Nov. 13, 2014.
International Patent Application No. PCT/CA2013/050345, International Search Report dated Jul. 26, 2013.
International Patent Application No. PCT/CA2014/050943, International Preliminary Report on Patentability dated Apr. 14, 2016.
International Patent Application No. PCT/CA2014/050943, International Search Report and Written Opinion dated Jan. 16, 2015.
Nishizawa et al., "Fuel Cell and Li-ion Battery Direct Hybridization System for Aircraft Applications", Journal of Power Sources, Jan. 2013, vol. 222, pp. 294-300.
San Martin, et al., "Modelling of PEM Fuel Cell Performance: Steady-State and Dynamic Experimental Validation", Energies, Feb. 2014, vol. 7, pp. 670-700.
U.S. Appl. No. 13/874,798, Notice of Allowance dated Feb. 12, 2016.
U.S. Appl. No. 13/874,798, Office Action dated Jul. 30, 2015.
U.S. Appl. No. 14/389,877, Office Action dated Mar. 14, 2017.
Written Opinion for Application No. PCT/CA2013/050345, dated Jul. 26, 2013, 4 pages.
Chinese Patent Application No. 201380022983, Office Action dated Jul. 20, 2017—English Translation Available.
Chinese Patent Application No. CN201380022983.2, Office Action dated Mar. 28, 2018—English Translation Available.
Chinese Patent Application No. CN2014863045, Office Action dated Apr. 12, 2018—English Translation Available.
European Patent Application No. 14850917.7, Office Action dated May 8, 2018.

(56) References Cited

OTHER PUBLICATIONS

European Patent Application No. 13773056.0, Office Action dated Nov. 16, 2017.
European Patent Application No. 14850917.7, Extended European Search Report dated Apr. 10, 2017.
Page et al., "Testing Procedure for Passive Fuel Cell State of Health," Australasian Universities Power Engineering Conference, Sep. 2004, 6 pages.
U.S. Appl. No. 14/504,013, Final Office Action dated Jun. 4, 2018.
U.S. Appl. No. 14/398,614, Notice of Allowance dated May 24, 2018.
U.S. Appl. No. 14/389,877, Final Office Action dated Apr. 9, 2018.
U.S. Appl. No. 14/389,877, Non-Final Office Action dated Aug. 30, 2017.
U.S. Appl. No. 14/398,614, Final Office Action dated Feb. 8, 2018.
U.S. Appl. No. 14/398,614, Non-Final Office Action dated Jul. 10, 2017.
U.S. Appl. No. 14/504,013, Non-Final Office Action dated Oct. 26, 2017.
Chinese Patent Application No. 201480063045.1, Office Action dated Sep. 11, 2018—English Translation Available.

\* cited by examiner

FAST STARTING FUEL CELL

CROSS-REFERENCES TO RELATED APPLICATIONS

This application is a National Stage Entry of International Application No. PCT/CA2014/050943, filed Oct. 1, 2014, which claims the benefit of U.S. provisional patent application No. 61/885,787 filed on Oct. 2, 2013, both of which are incorporated herein by reference.

FIELD

This specification relates to electrical power systems having a fuel cell.

BACKGROUND

A PEM fuel cell module includes a fuel cell stack. The fuel cell stack contains numerous polymer electrolyte membranes, alternatively called proton exchange membranes, which conduct protons between the electrodes. A PEM fuel cell is powered by a first reactant comprising oxygen, for example air, and a second reactant comprising hydrogen, for example essentially pure hydrogen or methane. Other types of fuel cell modules are also known.

A fuel cell module may be combined with a battery to provide a hybrid electrical power supply system. For example, hybrid power systems can be used to provide a back-up power supply in case of grid failure. In another example, a hybrid power system can be used to power a vehicle. In these cases, and others, it would be desirable to be able to start a fuel cell in a short period of time. In the case of a back-up power supply, the battery is required among other things to provide enough storage to carry anticipated loads until the fuel cell is started.

Currently available fuel cell modules typically start in about 20-60 seconds. The start time is measured from the time of a start command until the module delivers power to a load or reaches a specified percentage, for example 80% or 100%, of its rated power output.

A fuel cell produces voltage according to a polarisation curve. The polarisation curve describes the fuel cell voltage as a function of the fuel cell current or the fuel cell current density. In general, as current supplied by the fuel cell increases from zero, the fuel cell voltage initially drops rapidly through an activation region, then drops nearly linearly through an ohmic region, then drops more rapidly through a mass transport region. A battery typically has a different polarisation curve and so at some times, for example when a fuel cell is starting or disconnected, a battery and fuel cell may have incompatible polarisation curves. In some cases, a battery and fuel cell are connected through a DC to DC voltage converter to help manage differences in their polarisation curves.

INTRODUCTION

The following introduction is intended to introduce the reader to the detailed description to follow and not to limit or define any claimed invention.

In an electrical power supply, a faster starting fuel cell may allow a smaller battery to be used. Optionally no battery, other than a battery used to start the fuel cell, may be required if the start-up sequence is reduced sufficiently. In the case of a vehicle, the fuel cell and battery typically work together to provide maximum acceleration or maximum peak power. In this case, a fast starting fuel cell allows the vehicle to be operated without delay and may enable the fuel cell to be shut down, rather than idle, when the vehicle is stopped at traffic signals. It is desirable, for example for the reasons given above, to be able to start a fuel cell faster, for example in 5 seconds or less or 2 seconds or less. It is also desirable to provide a fuel cell starting method and apparatus that can optionally be used without a voltage converter.

This specification describes an electrical power supply system having a fuel cell module and a battery. The fuel cell module and battery operate in at least partially overlapping voltage ranges. The fuel cell module can be selectively connected to the battery through a diode. At least during a start-up procedure, one or more reactant pumps for the fuel cell optionally are driven by the battery. The system preferably also has a current sensor and a controller. The controller is adapted to close a contactor in a by-pass circuit around the diode after sensing a current flowing from the fuel cell through the diode. The system preferably also has a contactor in series with the diode. The system may also have a resistor and a contactor in a discharge circuit.

This specification also describes a start-up method for a fuel cell module, for example a fuel cell module in an electrical power system as described above. In the method, a first contactor is closed to connect the fuel cell in parallel with the battery through a diode and one or more reactant pumps for the fuel cell are turned on. A current sensor is monitored for a signal indicating current flow through the diode. After a current is indicated, a by-pass circuit is connected around the diode.

Optionally, one or more fuel cell module status checks or pre-start procedures may be performed before starting the fuel cell module. In some cases, the fuel cell module is discharged before starting the fuel cell module. A shut down procedure is also described herein.

FIGURES

DETAILED DESCRIPTION

Figure 1:
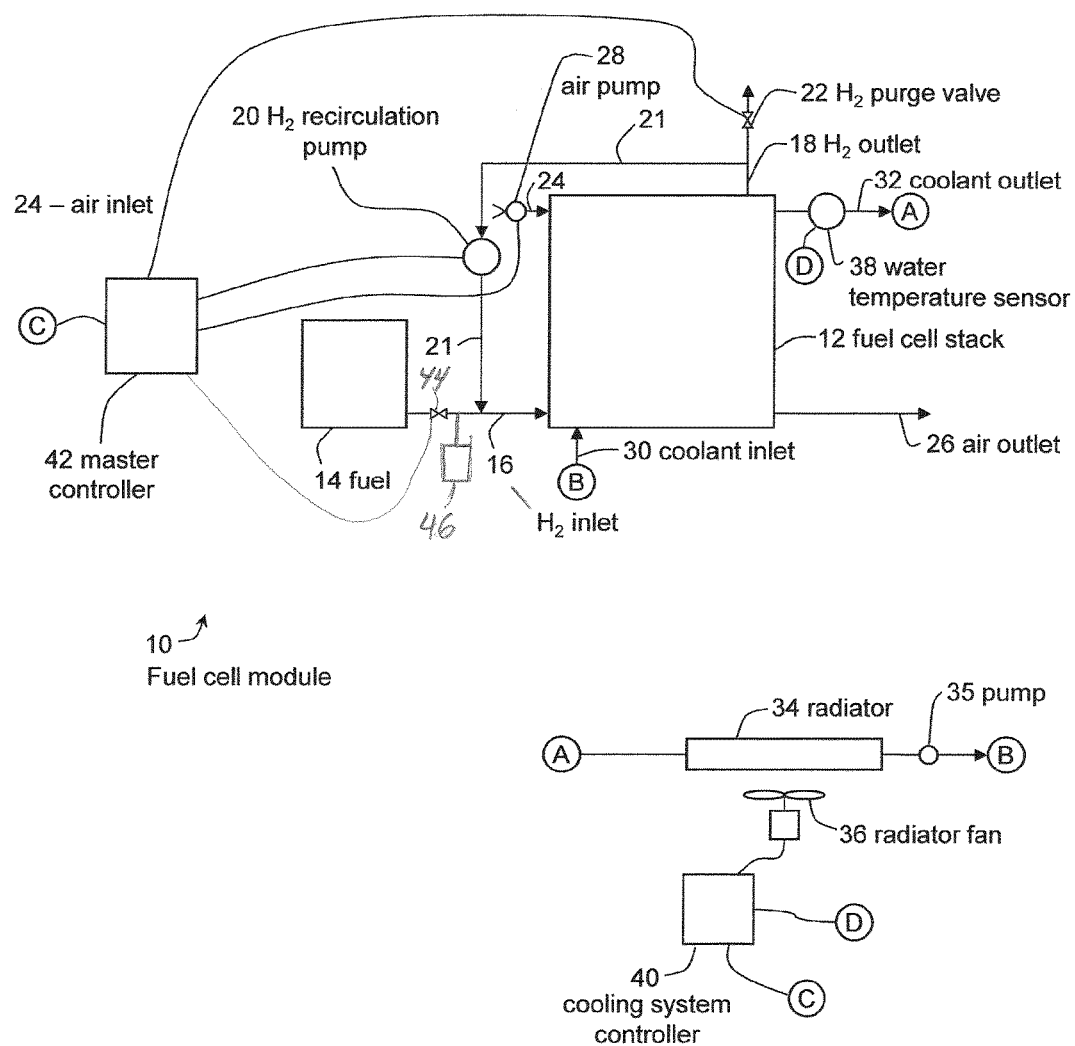
FIG. 1 is a schematic drawing of various components a fuel cell module.

FIG. 1 shows a fuel cell module 10. The fuel cell module 10 has a fuel cell stack 12 containing a plurality of PEM cells. Flow field plates within the stack 12 define a coolant path, a fuel side path (also called a hydrogen or anode side path) and an air side path (also called an oxygen or cathode side path). Various balance of plant elements are used to manage the flow of materials through these paths. Some examples of balance of plant elements will be described below as shown in FIG. 1 but other balance of plant elements or configurations may also be used.

Hydrogen, or a fuel containing hydrogen, is released from a fuel source 14, enters the stack 12 at a hydrogen inlet 16 and exits the stack 12 from a hydrogen outlet 18. Unreacted hydrogen released from the hydrogen outlet 18 travels through a re-circulation loop 21 back to the hydrogen inlet 16. Flow in the re-circulation loop 21 is driven by a hydrogen re-circulation pump 20. From time to time, hydrogen, other impurities and water are removed from the fuel side of the stack by opening a purge valve 22. The purge valve 22 may be a solenoid valve or another type of valve that can be operated by a mechanical, electrical or computerized controller.

Air (or oxygen or oxygen enriched air or oxygen depleted air) flows into the stack 12 through an air inlet 24. Air and water vapor leave the stack 12 through an air outlet 26. The flow of air is driven by an air pump 28. The air pump 28 may operate at a constant speed or be driven by a variable frequency drive or other speed controllable motor. The air pump 28 may be connected to the air inlet 24 or the air outlet 26.

Coolant, such as water or a mixture of water and an alcohol or another anti-freeze agent, enters the stack 12 through a coolant inlet 30 and exits the stack 12 from a coolant outlet 32. From the coolant outlet 32, the coolant passes through a radiator 34 or other heat exchanger before returning to the coolant inlet 30. Coolant moves through this loop, optionally at a generally constant flow rate, driven by pump 35. A coolant temperature sensor 38 sends a signal indicating the coolant or stack 12 temperature to a coolant system controller 40. The coolant temperature sensor 38 can be located in the stack 12 or anywhere in the external part of the coolant loop. The coolant system controller 40 adjusts the speed of a radiator fan 36 as required to keep the temperature near, or within a specified range around, a temperature set point. Alternatively, the coolant system controller 40 could adjust the speed of the coolant pump 35, move a baffle controlling the flow of air to the radiator 34, alter the flow of another fluid through a heat exchanger or otherwise adjust the temperature of the coolant or the stack 12.

The module 10 also has a master controller 42. The master controller 42 operates the hydrogen recirculation pump 20, the purge valve 22, the air pump 28 and other balance of plant elements directly or by sending data to controllers associated with those elements. The master controller 42 also supplies the temperature set point to the coolant system controller 40. The master controller 42 comprises a computer, such as a general purpose computer or a programmable logic controller, communication ports, and data storage. Optionally, the master controller 42 and coolant system controller 40 could be combined into a single controller.

Optionally, a signal associated with the recirculation pump 20 is sent to the master controller 42 and considered to determine if a cell is flooded. U.S. Provisional application No. 61/642,846 is incorporated by reference. In an example, the recirculation pump 20 is a regenerative or centrifugal pump operating at a generally constant voltage or speed. When the humidity in the fuel side of a cell stack increases, or a cell contains liquid water, more energy is required to achieve the same volumetric flow rate in the hydrogen recirculation loop. A signal indicating the current drawn by the recirculation pump 20 is sent to the master controller 42. The master controller 42 can correct flooding on the hydrogen side of a fuel cell stack 12 most rapidly by opening the purge valve 22.

Optionally, there may be a controllable bypass line between the air outlet 26 and the air inlet 24. The flow of air in the by-pass line, if any, may be altered to control the relative content of oxygen in air flowing through the fuel cell stack 12. This allows the polarisation curve of the fuel cell module 10 to be modified if desired. The master controller 42 may be connected to one or more valves in a by-pass line between the air outlet 26 and the air inlet 24, and/or in one or more of the air outlet 26 and the air inlet 24. Modulating one or more of these valves alters the partial pressure of oxygen (or oxygen concentration) in the air side of the fuel cell stack 12 even though the total gas flow rate (in this case oxygen depleted air) remains generally unchanged. The voltage of the fuel stack 12 varies more with the partial pressure of oxygen than with the total flow of gas thru the stack. A higher oxygen partial pressure produces a higher voltage at a given current output while a lower oxygen partial pressure produces a lower voltage at a given current output. U.S. Provisional application No. 61/827,318 is incorporated by reference.

Figure 2:
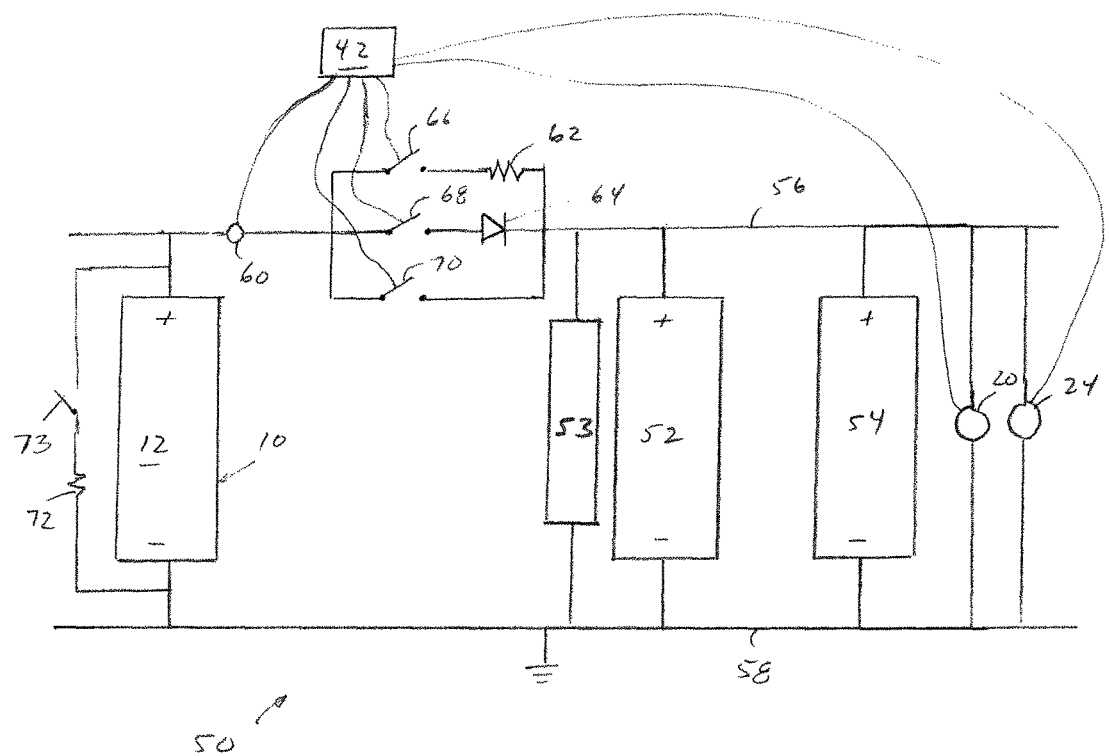
FIG. 2 is a schematic drawing of various components of an electrical power supply system having a fuel cell module as in FIG. 1.

FIG. 2 shows an electrical power supply system 50. The system 50 has a fuel cell module 10 and a battery 52. Optionally, the battery 52 may be replaced with a different type of electrical storage device, for example a capacitor. The electrical power supply system 50 is used to provide electrical power to a load 54. The load 54 may be, for example, a motor in a vehicle or other machine. In another example, the load 54 may be a building or other structure, or electronic equipment such as a cellular telephone tower or computer server, that may require back-up power. A rectifier 53 is optionally provided in cases where the system 50 is also connected to an electrical grid. A load may be attached to the system 50 through the rectifier 53. The load 54 may be selectively connected to a bus 56 and ground 58 that are also connected to the electrical power supply system 50. At various times, for example when a vehicle is required to accelerate or when an electrical grid fails, the load 54 draws power from the electrical power supply system 50.

The fuel cell and battery can operate in at least partially overlapping voltage ranges. For example, the battery 52 may have a nominal 48 volt potential. However, the battery 52 may actually have a voltage ranging from about 40-60 volts depending on its state of charge and current output. The fuel cell module 10 may also have a nominal 48 volt output. However, the fuel cell stack 12 may actually have a voltage ranging from about 0 to 100 volts depending on the flow of reactants and the current output of the fuel cell module 10.

The electrical power supply system 50 also has a current sensor 60, or another sensor capable of indicating whether a current is present, and optionally three parallel circuits between the fuel cell module 10 and the bus 56. Preferably, there is no voltage converter between the fuel cell stack 12 and the bus 56. Optionally, a voltage converter can be used. A first circuit has a discharge resistor 62 and a discharge contactor 66. A second circuit has a diode 64 and a first, or start-up, contactor 68. A third circuit has a by-pass contactor 70. The contactors 66, 68 and 70 are typically relay switches that can be opened or closed by the master controller 42. It is desirable to manage the operation of the contactors 66, 68 and 70 so that they are not required to make or break connections between large voltage differentials or while carrying large currents to reduce the size of the contactors required and increase the lifetime of the contactor.

Referring back to FIG. 1, the master controller 42 is also connected to a fuel valve 44 which can be used to isolate or connect the source of fuel 14 to the fuel cell stack 12. The source of fuel 14 may be, for example, a pressurized hydrogen or methane container. The fuel cell module 10 may also have a shut-down reservoir 46 to store a smaller amount of fuel to be used to consume residual oxygen in the fuel cell stack 12 and blanket the fuel cell stack 12 with nitrogen on shut down. Referring to FIG. 2, a small shut down resistor 72 may optionally be connected across the fuel cell stack 12 to enable nitrogen blanketing on shut down. As shown in FIG. 1, the shut down resistor 72 optionally has a shut down contactor 73. One form of nitrogen blanketing is described in U.S. Pat. No. 7,425,379 B2, entitled Passive Electrode Blanketing in a Fuel Cell and issued on Sep. 16, 2008, which is incorporated by reference. U.S. Provisional application No. 61/619,073 is incorporated by reference. Although a single master controller 42 is shown in FIGS. 1 and 2, the functions of the master controller 42 may alternatively be divided across multiple controllers.

The master controller 42 receives a start command when power is required from the fuel cell module 10 in particular or from the electrical power supply system 50 in general. The start command may be generated in various ways by a human, mechanical or electronic operator. For example, the start command may be generated by a controller associated with the load 54. Alternatively, the start command may be generated by a sensor detecting a condition, for example low voltage in the bus 56. Upon receiving the start command, the master controller 42 initiates a starting sequence.

In one option, the starting sequence begins by opening the fuel valve 44, turning on air pump 28, preferably opening hydrogen purge valve 22, turning on hydrogen recirculation pump 20 and closing the start-up contactor 68. These steps preferably happen as quickly as reasonably possible. Optionally, a quantity of compressed air or other oxygen containing gas may be connected to the air inlet 24 to reduce start up time since the air pump 28 requires time to reach its full operating speed. The air pump 28 and hydrogen recirculation pump 20 are preferably operated at essentially their full power, for example at 80% or more of their full power, so that voltage will build in the fuel cell stack 12 as quickly as possible. The air pump 28 and hydrogen recirculation pump 20 are both preferably powered from the bus 56, or directly from the battery 52, to enable them to draw power before the fuel cell stack 12 has significant voltage and without initially requiring current from the fuel cell stack 12.

The discharge contactor 66 and by-pass contactor 70 are left open such that current can only flow from the fuel cell module 10 to the bus 56 though the diode 64. However, the diode 64 prevents any current from flowing until the voltage of the fuel cell stack 12 exceeds the voltage of the battery 52 or bus 56 by a threshold value, for example 0.7 V. When the current sensor 60 detects current above a selected threshold, for example 10 A, the by-pass contactor 70 is closed. The start-up contactor 68 is preferably then opened. In this way, neither the start-up contactor 68 nor the by-pass contactor 70 is required to make or break connections that would cause rapid changes in the power flowing through the contactor 68, 70. As an alternative to using current sensor 60, the by-pass contactor 70 can be closed when another form of instrument indicates that current is flowing from the fuel cell stack 12. For example, current flow can be determined by a voltage drop across the diode 64 or a differential voltage between the fuel cell stack 12 and the bus 56. Although power will not flow through the diode 64 with by-pass contactor 70 closed, opening the start-up contactor 68 protects against damage to the diode 64 if the by-pass contactor 70 fails or if the fuel cell stack 12 voltage spikes when the by-pass contactor 70 is opened intentionally on shut down. Opening the start-up contactor 68 also provides certainty that opening by-pass connector 70 after a shut-down command will truly stop the flow of power from the fuel cell stack 12 to the bus 56.

The fuel cell module 10 can be considered to have started as soon as the by-pass contactor 70 closes or current starts to flow across the diode 64. However, the fuel cell module 10 may continue to increase its power output after this point. Alternatively, the fuel cell module 10 may be considered to have started when it reaches a certain percentage of its rated power, for example 80% or 100%. The fuel cell module 10 is preferably started in 5 seconds or less, 3 seconds or less or even 2 seconds or less. Once started, the master controller 42 switches to a normal operating mode. In the normal operating mode, the air pump 28 and hydrogen recirculation pump 20 are not necessarily run at full speed. Instead, the master controller 42 operates the fuel cell module to provide power as required while maintaining safe and efficient operation which may include modulating the air pump 28 and hydrogen recirculation pump 20 among other balance of plant elements.

With some designs of fuel cell stack 12, it is possible for one or more cells to become partially flooded with water if the fuel cell module has been off for a long time, for example 12 hours or more, before being started. If the fuel cell module 10 is started in this condition, the flooded cell may be damaged. To help prevent such damage, the master controller 42 may determine whether the fuel cell module 10 is likely to have a flooded cell before initiating the starting sequence described above. This determination can be based, for example, on a timer started when the fuel cell module 10 was last turned off, or by another parameter such as a temperature in the fuel cell module 10. If the fuel cell module 10 has been off for more than a selected time, or is below a certain temperature, a fault clearing and/or checking sequence is run. If not, then the starting sequence can begin immediately.

If a fault clearing or checking sequence is required, it is possible that the fuel cell stack may become charged, for example to its open cell voltage, before it can be determined that there are no flooded cells or any flooded cells can be cleared. However, a flooded cell will not be damaged if the fuel cell stack 12 is not delivering current. Accordingly, although the start-up contactor 68 could be left closed or even omitted, it is preferable to leave the start-up contactor 68 open during the fault clearing or checking sequence. Once it has been determined that there are no flooded cells, or flooded cells have been cleared, then discharge contactor 66 is closed to discharge the fuel cell stack 12 through the discharge resistor 62. Optionally, flood clearing can occur wholly or partially while discharging the fuel cell stack 12. As soon as the fuel cell stack 12 voltage is below the sum of the voltage of the bus 56 and the threshold voltage of the diode 64, or can be predicted to reach that voltage in the closing time of the start-up contactor 68, then the start-up contactor 68 can be instructed to close and the starting sequence described above begins.

The fuel cell stack 12 may also have a voltage higher than the voltage of the bus 56 after a very brief shutdown. In this or any other case when the fuel cell stack 12 has a high voltage, it is preferable to discharge the fuel cell stack 12 through the discharge resistor 62 before initiating the starting sequence to avoid exceeding the make limitations of a contactor 68 or 70. Discharge contactor 66 is opened after either the start-up contactor 68 or by-pass contactor 70 is closed.

Optionally, if the fuel cell stack 12 is initially charged, the starting sequence could be begin by closing the by-pass contactor 70 instead of the start-up contactor 68 when the voltage of the fuel cell stack 12 drops to within the make tolerance of the by-pass contactor 70 relative to the voltage of the bus 56. However, since the voltage of the fuel cell stack 12 preferably falls rapidly with time, and it takes some time for the by-pass contactor 70 to close, it can be difficult to time the closing of the by-pass contactor 70 with sufficient accuracy to avoid requiring a by-pass contactor 70 with a large make tolerance. Accordingly, it may be preferable to use the start-up contactor 68 as described above. When using the start-up contactor 68, the by-pass contactor 70 is only required to make a connection through a voltage differential equal to the voltage drop through diode 64, which may be on the order of one volt.

Optionally, discharge resistor 62 could alternatively be connected to ground 58 rather than bus 56, but its resistance would need to be higher to meet the same current limitation of the discharge contactor 66 or fuel cell stack 12 and the power rating would need to be much higher.

In the fault clearing and/or checking sequence, if any, the air pump 28 is run at substantially full speed. This provides oxygen to the fuel cell stack 12 while simultaneously removing water from the air side of fuel cell stack 12. The fuel valve 44 is also opened and hydrogen recirculation pump 20 turned on. The master controller 42 checks the stack for faults. For example, the master controller 42 may check whether the fuel cell stack 12 as a whole, or individual cells or groups of cells, are capable of reaching their full open cell voltage. Alternatively, or additionally, the master controller 12 may check whether the power consumption or speed of the hydrogen recirculation pump 20 indicates excessive humidity or water in the fuel cell stack 12. The hydrogen recirculation pump 20 is the preferred fault indicator since it can provide a reading before the fuel cell stack 12 reaches open cell voltage. This saves time before a fault is determined and also reduces time required to discharge the fuel cell stack 12. If no fault is detected, then the fuel cell stack 12 is discharged if it has a voltage above the voltage of the bus 56 and the start-up sequence first described above continues. If a fault is detected, the hydrogen purge valve 22 is opened, or other recovery methods occur, until flooding has been cleared from the hydrogen side of the fuel cell stack 12.

To shut down the fuel cell module 10, the fuel valve 44 is closed and the air pump 28 is turned off. Optionally, closing the fuel valve 44 may be delayed after shutting off the air pump 28 to allow time to confirm that the shut down will not be very brief. Hydrogen purge valve 22 is opened. Hydrogen supplied from the reservoir 46 and residual reactants are consumed in the fuel cell stack causing nitrogen blanketing in the fuel cell stack. When the current sensor 60 indicates that the fuel cell module 10 is no longer providing power to the bus 56, the by-pass contactor 70 is opened. The fuel cell stack 12 continues to discharge through resistor 72 while hydrogen blanketing continues. Optionally, the air pump 28 may be mechanically or electrically stopped, or isolated from the fuel cell stack 12 by a valve, before opening hydrogen purge valve 22 to reduce the time and hydrogen required for nitrogen blanketing. Alternatively, the air pump 28 can be operated at essentially full power for a few seconds before closing fuel valve 44 and before or concurrently with opening the hydrogen purge valve 22 to remove humidity from the fuel cell stack 12 and thereby reduce the chance of a flooded cell on the next start up. As a further option, the fuel cell stack 12 may also be discharged to below the voltage of the bus 56 through the resistor 62 if there is a voltage spike in the fuel cell stack 12 after opening the by-pass contactor 70 to be ready for the next start up more quickly.

In one particular example of a shut-down procedure, the air pump 28 is shut off and the fuel valve 44 remains open. Reactants in the fuel cell stack 12 are consumed while current delivered by the fuel cell stack 12 decreases. When the current sensor 60 indicates that the fuel cell stack 12 is delivering less than a selected current, for example 10 A, the by-pass contactor 70 is opened, at which point fuel valve 44 is closed. Optionally, the air pump 28 is then operated briefly to remove water from the fuel cell stack 12. Whether the air pump 28 is operated or not, the fuel cell stack 12 voltage is likely to rise to open circuit voltage when the by-pass contactor 70 is opened. The fuel cell stack 12 is discharged through the resistor 72, resistor 62, or both at the same time or in sequence, to the bus 56 voltage or less, preferably to essentially no voltage, while nitrogen blanketing continues. If the air pump 28 is operated to remove water from the fuel cell stack 12, either valve 44 remains open for a longer period of time or the size of reservoir 46 is increased to facilitate nitrogen blanketing after the air pump 28 has been operated to remove water from the fuel cell stack 12.

Optionally, resistor 72 may be left connected for only as long, if at all, as required to consume the residual reactants in the fuel cell stack 12. The fuel cell stack 12 may then be left while off in a partially charged stated and either connected to, or disconnected from, the bus 56. Optionally, the fuel cell stack 12 may be left connected to the bus 56 at all times, or at least for a period of time while the fuel cell module 10 is off. This is not preferred since residual voltage in the fuel cell stack 12 can degrade the fuel cell stack over time or may be a hazard. But if the fuel cell stack 12 is left connected, it must be checked for flooded cells on start-up while not delivering power to avoid damaging a flooded cell. In this case, a flooded cell check is done by monitoring the power consumption or speed at constant power of the hydrogen recirculation pump 20 before turning the air pump 28 on and before opening the fuel valve 44. The fuel valve 44 and hydrogen purge valve 22 are opened as required to remove water if a flooded cell is detected. If no flooding on the hydrogen side is detected, the air pump 28 is turned on full to remove any flooding on the air side of the fuel cell stack 12 and to start the fuel cell stack 12 creating power.

One start up procedure involves first determining if a no load check for flooded cells or other faults is required, and if the fuel cell stack 12 voltage exceeds the bus 56 voltage. If a fault check is required, then the fault check is conducted. If a fault is detected, the fault is corrected, primarily by operating the air pump 28 and opening the hydrogen purge valve 22 to remove excess water from the fuel cell stack 12. If no fault is detected, or if a fault is detected and then cleared, of if the fuel cell stack 12 was otherwise above the bus 56 voltage, then the fuel cell stack 12 is discharged. If no load check was required and the fuel cell stack 12 voltage was not above the bus 56 voltage, or the fuel cell stack has been discharged, then the start-up sequence begins by closing the start-up contactor 68. When the fuel cell stack is providing a specified current, the by-pass contactor 70 is closed and the start-up contactor 68 is opened.

The invention claimed is:

1. An electrical power supply system comprising,
   a) a fuel cell module;
   b) a source of electrical power;
   c) a diode; and,
   d) an electrical circuit configured to selectively connect the fuel cell module in parallel with the source of electrical power either around or through the diode,
   wherein the forward direction of the diode is from the fuel cell module towards the source of electrical power and the diode is in series with the fuel cell module; and
   wherein the electrical circuit comprises a by-pass circuit around both of the diode and a start up contactor or other switch in series with the diode.

2. The system of claim 1 further comprising,
   one or more reactant pumps for the fuel cell selectively connectable to the source of electrical power.

3. The system of claim 1 further comprising,
one or more sensors adapted to determine current flowing through the diode.

4. The system of claim 3 further comprising,
a controller connected to the one or more sensors and adapted to connect the fuel cell module to the battery or other source of electrical power either around the diode when current flowing through the diode reaches a threshold.

5. The system of claim 1 wherein the electrical circuit comprises a by-pass circuit around the diode, the by-pass circuit having a contactor or other switch.

6. The system of claim 4 wherein the electrical circuit comprises a by-pass circuit around the diode, the by-pass circuit having a contactor or other switch, and the controller is connected to the contactor or switch.

7. The system of claim 1 having a resistor, and preferably a contactor or other switch, in a discharge circuit around the diode and around the by-pass circuit.

8. The system of claim 1 wherein the fuel cell module and source of electrical power operate in at least partially overlapping voltage ranges.

9. The system of claim 1 wherein the fuel cell module and source of electrical power are connected to collectively supply power to a load.

10. The system of claim 1 wherein the fuel cell module is connected to the source of electrical power without a voltage converter.

11. A start-up method for a fuel cell module comprising steps of,
   a) connecting the fuel cell in parallel with a battery or other source of electrical power through a diode in series with the fuel cell while conducting a fuel cell start up procedure; and
   b) when there is current flowing from the fuel cell through the diode, by-passing the diode through a by-pass circuit around the diode.

12. The method of claim 11 further comprising a step of, checking for current flowing through the diode between steps a) and b).

13. The method of claim 11 comprising the steps of,
closing the first contactor or other switch to connect the fuel cell in parallel with the battery or other source of electrical power through the diode;
turning one or more reactant pumps for the fuel cell on;
monitoring a current sensor for a signal indicating current flow through the diode;
after a current is indicated, by-passing the diode.

14. The method of claim 11 wherein, at least during the fuel cell start-up procedure, one or more reactant pumps for the fuel cell are driven by the battery or other source of electrical power.

15. The method of claim 11 wherein the fuel cell is started in 5 seconds or less or 2 seconds or less.

16. The method of claim 11 further comprising performing one or more fuel cell module status checks or pre-start procedures before starting the fuel cell module.

17. The method of claim 11 further comprising discharging the fuel cell module before starting the fuel cell module.

18. The method of claim 11 wherein the fuel cell and battery or other source of electrical power are connectable to collectively supply power to a load.

19. An electrical power supply system comprising,
   a) a fuel cell module;
   b) a battery, wherein the fuel cell module and the battery are connected as parallel power supplies;
   c) a diode in series with the fuel cell module between the fuel cell module and the battery;
   d) one or more reactant pumps for the fuel cell connected to receive power from the battery;
   e) one or more sensors adapted to determine current flowing through the diode;
   f) a by-pass circuit around the diode, the by-pass circuit having a contactor; and,
   g) a controller adapted to close the contactor in the by-pass circuit when current flowing from the fuel cell module through the diode increases to reach or exceed a threshold.

* * * * *